Aug. 7, 1956 G. JENDRASSIK 2,757,509
JET REACTION PROPULSION UNITS UTILIZING A PRESSURE EXCHANGER
Filed June 5, 1950 2 Sheets-Sheet 1
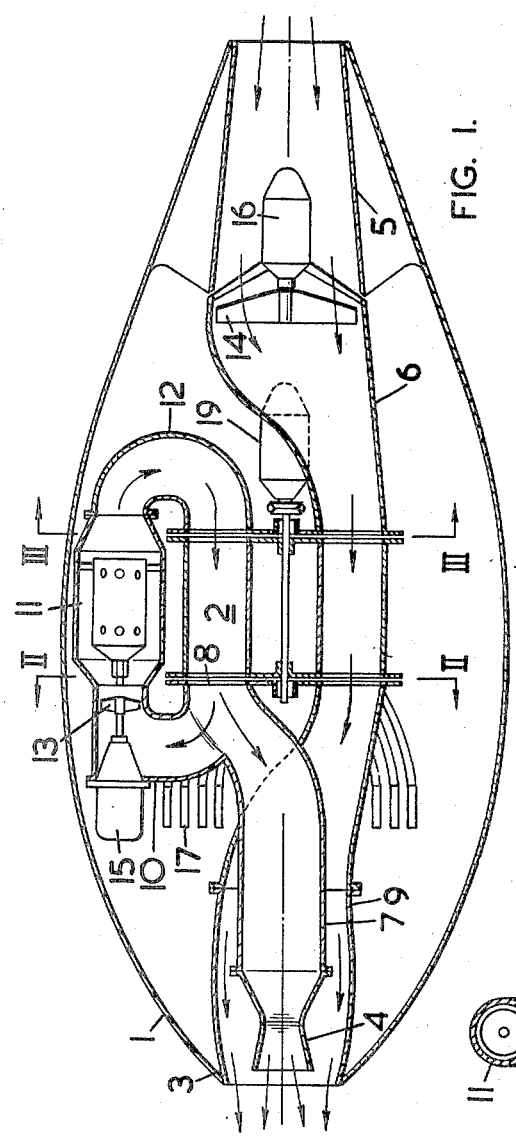
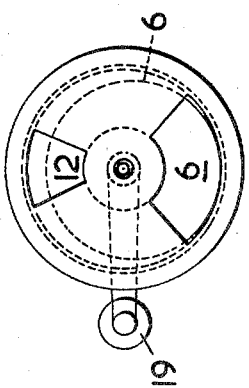
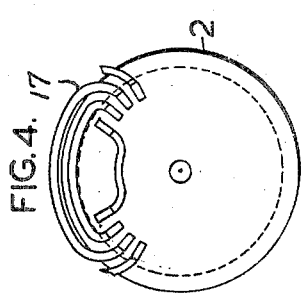
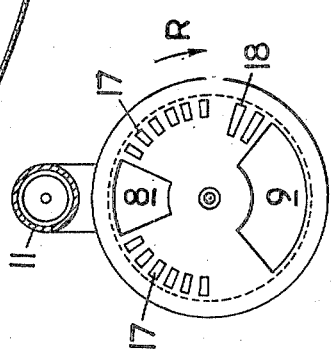
Inventor
George Jendrassik
By Stevens, Davis, Miller & Mosher
His Attorneys

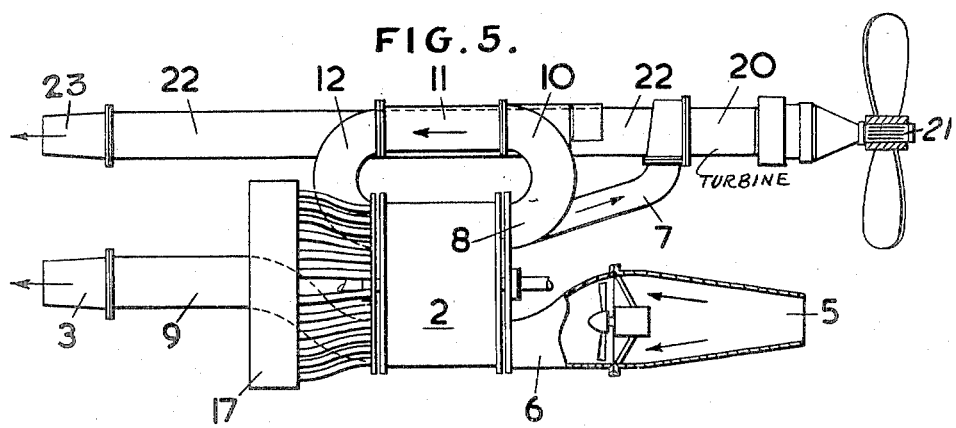
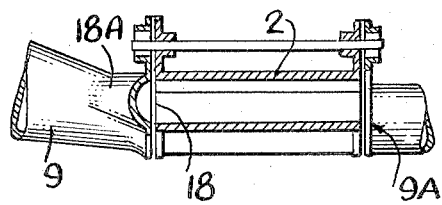
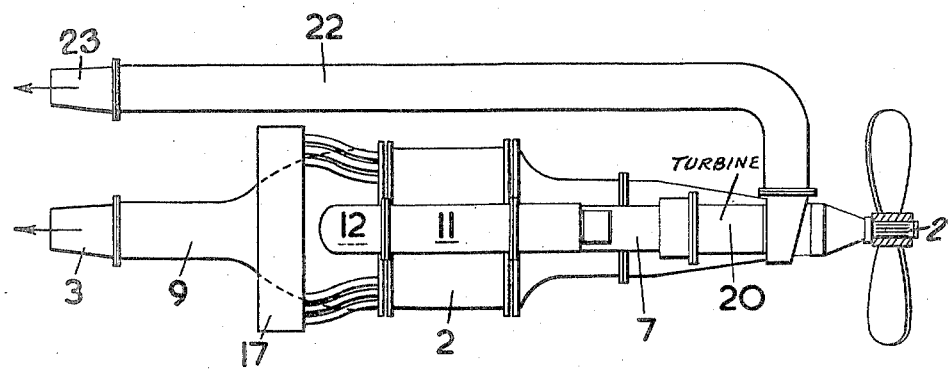

United States Patent Office 2,757,509
Patented Aug. 7, 1956

2,757,509

JET REACTION PROPULSION UNITS UTILIZING A PRESSURE EXCHANGER

George Jendrassik, London, England; Andre G. T. Boszormenyi and Clara Jendrassik, executors of said George Jendrassik, deceased Application June 5, 1950, Serial No. 166,283

Claims priority, application Great Britain June 14, 1949

11 Claims. (Cl. 60—35.6)

This invention relates to the propulsion of vehicles, by which is herein meant more particularly aircraft (including aerial missiles), but also such marine craft and land vehicles as are amenable to jet propulsion, either as a main or an auxiliary source of power.

The invention deals mainly with the application to reaction propulsion of the devices known as pressures exchangers by which term is to be understood rotary machines (being heat engines working with gaseous fluid), which comprise at least one rotor embodying cells arranged as a circular series (or the alternative mentioned in the next following paragraph), the working cycle of which machines involves the compression of gas in some cells of the series and the simultaneous expansion of gas in other cells of the series, the compression and expansion stages thus formed being associated with heat input and heat rejection stages (at high or low pressure) involving the flow of gas into, and/or out of, the cells.

The above definition of pressure exchangers will be assumed to include the possible case in which a circular series of cells is accommodated in non-rotary structure and co-operates with rotary structure embodying ducts for the gas flow associated with the heat input and rejection stages.

The present invention provides apparatus for vehicle propulsion comprising a pressure exchanger, constructed to function by taking in air and delivering a supply of high pressure hot gas, and which is scavenged at least at the heat rejection stage, nozzle means for the expansion of a gaseous stream to form a propulsive jet, and ducting for supplying, from the pressure exchanger to the nozzle means, gas which is at a suitable temperature and pressure to provide by expansion through the nozzle means, useful propulsive thrust which either constitutes, or assists, the main means of propelling the vehicle.

If the main output of the apparatus is in the form of thrust supplied by the nozzle means, then the latter may be supplied with gas rejected by the pressure exchanger during the heat input stage, and possibly, to provide further thrust. Gas removed during the low pressure scavenging associated with heat rejection, may also be expanded through nozzle means to provide additional thrust. If the main output is in the form of mechanical work provided by a heat engine (e. g. a turbine) in which is expanded the gas rejected by the pressure exchanger at heat input, then nozzle means (which in this case furnishes auxiliary propulsive effort only) may be supplied only with gas removed from the pressure exchanger during the low pressure scavenging stage. Thus the said heat engine (e. g. turbine) may drive a normal airscrew, which is merely assisted by thrust from the nozzle means.

Preferably, in either case, the pressure exchanger is also scavenged at the heat input stage.

To augment the thrust in either case, each cell about to undergo the low pressure scavenging associated with heat rejection may be placed into communication, before being scavenged, with expansion nozzle means so that the gas in such cell is allowed to expand before reaching the low pressure scavenging zone, thereby furnishing propulsive thrust.

Pressure exchangers in which all or part of the pressure rise and fall occurring in the machine is effected by waves of compression and expansion may usefully be used in the present invention.

The so-called "exchange of pressure" between gas which is expanding and gas which is being compressed (e. g. between expansion cells which are in communication by "transfer gas" apertures with compression cells), which gives rise to the name of the machine under discussion, will, generally speaking, result at most in the equalization of the pressure difference between the communicating zones. It may be possible however, by appropriate designing, to further continue the exchanging process beyond the equalization point i. e. until the pressure of the gas which has been compressed has risen above that of the gas which has expanded.

The present invention lies in the adaptation of pressure exchangers to a new use, rather than in the details of the machines themselves, of which any type may be used which lends itself to the purpose herein under discussion. Thus, for example, machines using a single rotor, or more than one rotor, may be used.

The manner in which the invention may be carried out will now be described with reference to the examples shown in the accompanying drawings in which:

Figure 1 is a longitudinal section through the engine nacelle of aircraft.

Figure 2 is a section on the line II—II of Figure 1.

Figure 2A is a part sectional elevation showing some of the ducting leaving the pressure exchanger.

Figure 3 is a similar section on the line III—III on Figure 1.

Figure 4 is a schematic view showing diagrammatically the location of the transfer gas pipes as seen from the left of Figure 1.

Figure 5 is a side elevation with the nacelle structure removed of aircraft propulsion apparatus of which the major part of the propulsive output is delivered to an airscrew.

Figure 6 is a plan view of Figure 5.

The aircraft propulsion apparatus shown in Figure 1 to 4 comprises a nacelle 1 within which is located the propulsion apparatus proper. This comprises a single rotor pressure exchanger 2 functioning as a source of high pressure hot gas for expansion, and in which the heat input is supplied by the burning of fuel in a combustion chamber 11. The pressure exchanger is scavenged at both the heat input and the heat rejection stages. The rear of the nacelle is provided with concentric nozzles 3 and 4 together forming a nozzle arrangement, while the forward end comprises an air intake duct 5 which is formed as a diffuser so that the pressure of the incoming air is raised at the expense of the velocity.

An intermediate duct 6 so constructed that it is of constant cross-sectional area connects the intake 5 with the low pressure scavenging zone of the pressure exchanger, while the low pressure gas exhausted from that zone is conducted by way of duct 9 to the nozzle 3 in which it is expanded to provide propulsive thrust which assists that of the nozzle 4 as mentioned below.

The high pressure hot gas exhausted from the pressure exchanger during the heat input stage emerges into the duct 8 which divides into two portions, of which a branch 7 conducts gas to the nozzle 4 for expansion to provide the main propulsive thrust, while a branch 10 conducts gas to the combustion chamber 11. The heat energized gas leaving the combustion chamber is returned by way of duct 12 to the input side of the high pressure scavenging zone. Fans 13 and 14 driven respectively by motors 15, 16 are provided for the scavenging gas flow, but it may only be necessary for these fans to be used for auxiliary purposes, e. g. at starting.

Numeral 17 represents the group of transfer gas pipes which connect expansion stage cells of the pressure exchanger with cells in the compression stage. The direction of movement of the cell rotor is indicated by the arrow R in Figure 2. In order further to augment the propulsive thrust, the pressure exchanger is provided with apertures 18 (Figures 2 and 2A) which by way of ducts 18A place cells approaching the low pressure scavenging zone 9A into communication with the expansion nozzle 3, so that each cell before reaching the said low pressure zone is enable to expand thus producing further propulsive thrust.

The rotor of the pressure exchanger is driven by a motor 19. The embodiment shown in Figures 5 and 6 is similar in essentials to that of Figures 1 to 4, and common reference numerals are used for the same and similar parts. The chief difference of Figures 5 and 6 is that the gas exhausted at high pressure through the duct 7 is expanded not in a propulsion nozzle, but in a turbine 20 which through a reduction gear drives an airscrew 21 which provides most of the power needed. The turbine exhaust emerges into a duct 22 which is provided with a nozzle 23, forming with the nozzle 3 a nozzle arrangement, so that any residual velocity in the gases may augment the thrust by expansion in the nozzle.

In both the embodiments described above, the gas flow is indicated by the arrows.

The compression of incoming air in the diffuser intake 5 has the effect of increasing the efficiency of propulsion, and also has the effect of simplifying the machine by making provision for scavenging at low pressure.

What I claim is:

1. A jet reaction propulsion unit comprising an intake for an ambient air supply, a pressure exchanger operable simultaneously to compress air from a comparatively low pressure and to expand hot gases from a comparatively high pressure, ducting by means of which air is directly fed from said intake to said pressure exchanger for compression thereby, means for providing a scavenging process for said pressure exchanger, a combustion system supplied by said pressure exchanger with compressed air for supporting combustion therein and producing high pressure combustion gases and air for expansion in said pressure exchanger, at least one nozzle located so that a fluid expanded therethrough produces jet propulsive thrust, and a direct connection from said pressure exchanger to said nozzle through which flow said expanded gases and air.

2. A jet reaction propulsion unit comprising an intake for an ambient air supply, a pressure exchanger operable simultaneously to compress air from a comparatively low pressure and to expand hot gases from a comparatively high pressure, ducting by means of which air is directly fed from said intake to said pressure exchanger for compression thereby, means for providing a scavenging process for said pressure exchanger, a combustion system supplied by said pressure exchanger with compressed air for supporting combustion therein and producing high pressure combustion gases and air, a proportion of which are expanded in said pressure exchanger, a branch passage into which the remainder of said high pressure gases and air are diverted, at least one nozzle located so that a fluid expanded therethrough produces jet propulsive thrust, a direct connection from said pressure exchanger to said nozzle through which flow said expanded gases and air, and an extension of said branch passage to said nozzle through which flow said diverted gases and air.

3. A jet reaction propulsion unit as claimed in claim 2 comprising a number of outlets from said pressure exchanger for said expanding gases and air at different stages in the expansion process and connections from each of said outlets to said nozzle arrangement.

4. A jet reaction propulsion unit as claimed in claim 2 in which said scavenging means comprises at least one fan situated in said air intake.

5. A propulsion unit delivering shaft power and jet reactive thrust comprising an air intake for an ambient air supply, a pressure exchanger operable simultaneously to compress air from a comparatively low pressure and to expand hot gases from a comparatively high pressure, ducting by means of which air is directly fed from said intake to said pressure exchanger for compression thereby, means for providing a scavenging process for said pressure exchanger, a combustion system supplied by said pressure exchanger with compressed air for supporting combustion therein and producing high pressure combustion gases and air a proportion of which are expanded in said pressure exchanger, a branch passage into which the remainder of said high pressure gases and air are diverted, a gas turbine to which said passage leads said diverted gases and air, shaft driven by said gas turbine, at least one nozzle located so that a fluid expanded therethrough produces jet propulsive thrust, a direct connection from said pressure exchanger to said one nozzle through which flow said expanded gases and air.

6. A propulsion unit as claimed in claim 5 and comprising an extension of said branch passage beyond said gas turbine to another nozzle through which flow said diverted gases and air after they have done work in said gas turbine.

7. A jet reaction propulsion unit comprising an intake for an ambient air supply, a pressure exchanger operable simultaneously to compress air from a comparatively low pressure and to expand hot gases from a comparatively high pressure, ducting by means of which air is directly fed from said intake to said pressure exchanger for compression thereby, means for providing a scavenging process for said pressure exchanger, a combustion system supplied by said pressure exchanger with compressed air for supporting combustion therein and producing high pressure combustion gases and air for expansion in said pressure exchanger, a bifurcated duct downstream of said pressure exchanger having one branch through which compressed air and gas are supplied to the combustion system and another branch through which high pressure gas is extracted from the pressure exchanger, at least one nozzle located so that fluid expanded therethrough produces jet propulsive thrust and a direct connection from said other branch to said nozzle.

8. A jet reaction propulsive unit as claimed in claim 7 in which there are two of said nozzles and another direct connection is provided between the pressure exchanger and the other nozzle for flow therethrough of said expanded gases and air.

9. A jet reaction propulsion unit as claimed in claim 8 in which said nozzles are coaxially situated with said one nozzle having its outlet upstream of said other nozzle.

10. A jet reaction propulsion unit comprising an intake for an ambient air supply, a pressure exchanger operable simultaneously to compress air from a comparatively low pressure and to expand hot gases from a comparatively high pressure, ducting by means of which air is directly fed from said intake to said pressure exchanger for compression thereby, scavenging means in said intake ducting providing a scavenging process at the heat rejection stage of said pressure exchanger, a combustion system supplied by said pressure exchanger with compressed air for supporting combustion therein and producing high pressure combustion gases and air for expansion in said pressure exchanger, further scavenging means at the heat input stage of said pressure exchanger, at least one nozzle located so that fluid expanded therethrough produces jet propulsive thrust, and a direct connection from said pressure exchanger to said nozzle through which flow said expanded gases and air.

11. A jet reaction propulsion unit comprising an intake for an ambient air supply, a rotatable pressure exchanger cell wheel operable simultaneously to compress air from a comparatively low pressure and to expand hot gases from a comparatively high pressure, stationary ducting by means of which air is directly fed from said intake to said pressure exchanger for compression thereby, means for rotating said cell wheel, scavenging means in said intake ducting providing a scavenging process at the heat rejection stage of said pressure exchanger, a combustion system supplied by said pressure exchanger with compressed air for supporting combustion therein and producing high pressure combustion gases and air for expansion in said pressure exchanger, further scavenging means at the heat input stage of said pressure exchanger, at least one nozzle located so that fluid expanded therethrough produces jet propulsive thrust, and a direct connection from said pressure exchanger to said nozzle through which flow said expanded gases and air.

References Cited in the file of this patent

UNITED STATES PATENTS

| | | |
|---|---|---|
| 2,068,878 | Suczek | Jan. 26, 1937 |
| 2,168,726 | Whittle | Aug. 8, 1939 |
| 2,486,967 | Morrisson | Nov. 1, 1949 |
| 2,461,186 | Seippel | Feb. 8, 1949 |